United States Patent
van Vliet

(10) Patent No.: US 8,818,667 B2
(45) Date of Patent: Aug. 26, 2014

(54) METHOD FOR PRODUCING A DIFFERENTIAL TORQUE ACTING ON THE VEHICLE WHEELS OF A VEHICLE

(75) Inventor: Peter van Vliet, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 80 days.

(21) Appl. No.: 13/265,287

(22) PCT Filed: May 3, 2010

(86) PCT No.: PCT/EP2010/055965
§ 371 (c)(1),
(2), (4) Date: Oct. 19, 2011

(87) PCT Pub. No.: WO2010/142496
PCT Pub. Date: Dec. 16, 2010

(65) Prior Publication Data
US 2012/0046842 A1    Feb. 23, 2012

(30) Foreign Application Priority Data
Jun. 8, 2009    (DE) .......................... 10 2009 026 813

(51) Int. Cl.
*G06F 17/00*    (2006.01)

(52) U.S. Cl.
USPC ............................................................ 701/69

(58) Field of Classification Search
USPC .......... 701/69–70, 36–38; 280/248, 233–234
See application file for complete search history.

(56) References Cited

U.S. PATENT DOCUMENTS

| | | | |
|---|---|---|---|
| 4,961,476 A * | 10/1990 | Witte et al. ................... | 180/197 |
| 6,338,392 B1 | 1/2002 | Schmitt | |
| 6,339,739 B1 | 1/2002 | Folke et al. | |
| 6,502,014 B1 | 12/2002 | Herrmann et al. | |
| 7,330,785 B2 | 2/2008 | Odenthal et al. | |
| 2003/0037977 A1 | 2/2003 | Tatara et al. | |
| 2003/0146034 A1* | 8/2003 | Gassmann et al. ............ | 180/248 |
| 2006/0074530 A1* | 4/2006 | Meyers et al. .................... | 701/1 |
| 2007/0185638 A1* | 8/2007 | Odenthal et al. ................ | 701/70 |
| 2010/0030443 A1 | 2/2010 | Okamoyo | |
| 2010/0056338 A1 | 3/2010 | Erban | |

FOREIGN PATENT DOCUMENTS

| | | |
|---|---|---|
| CN | 101472754 | 7/2009 |
| DE | 19919180 | 11/2000 |
| DE | 102004035004 | 2/2006 |
| DE | 102006031511 | 1/2008 |
| JP | 10-86705 | 4/1998 |
| JP | 11-240458 | 9/1999 |
| WO | WO 99/67115 | 12/1999 |
| WO | WO 2005/042294 | 5/2005 |
| WO | WO 2007/148225 | 12/2007 |

OTHER PUBLICATIONS

International Search Report, PCT International Application No. PCT/EP2010/055965, dated Jul. 9, 2010.

* cited by examiner

*Primary Examiner* — Yonel Beaulieu
(74) *Attorney, Agent, or Firm* — Kenyon & Kenyon LLP

(57) ABSTRACT

In a method for generating a differential torque in a vehicle, in the case in which the vehicle is in a load change state and simultaneously in an extreme driving situation, in which wheel torques of different magnitudes are present at the vehicle wheels, the torque distribution between the vehicle wheels is changed.

12 Claims, 2 Drawing Sheets

200

METHOD FOR PRODUCING A DIFFERENTIAL TORQUE ACTING ON THE VEHICLE WHEELS OF A VEHICLE

FIELD OF THE INVENTION

The present invention relates to a method for producing a differential torque acting on the vehicle wheels of a vehicle.

BACKGROUND INFORMATION

German Patent Application No. DE 10 2006 031 511 A1 describes a method for stabilizing a vehicle in an extreme driving situation, particularly in the case of over-steering or under-steering the vehicle, in which a vehicle controller intervenes in the driving operation by automatically operating at least one wheel brake. The activation of the wheel brake is done with the aid of a vehicle regulating system, especially an ESP system (electronic stability program).

An automatic intervention in the resultant torques at the vehicle wheels may also be carried out with the aim of improving the dynamic response of the vehicle. Thus, conventionally, for instance, one may carry out an active distribution of drive torques to the left and right vehicle wheels via a so-called torque vectoring actuator. One should take care, however, that when making such an intervention, in extreme driving situations, no destabilizing of the vehicle is effected.

SUMMARY

An object of the present invention is to prevent destabilization of the vehicle, in the case of a differential torque acting on the wheels of a vehicle.

In an example method according to the present invention, in specified driving situations, there are wheel torques of different magnitudes at at least two vehicle wheels, particularly at a left and a right vehicle wheel. The wheel torques that are present are resultant torques, which may be composed of braking torques and/or drive torques, it being basically sufficient, within the scope of the present invention, to have only one braking torque or only one drive torque act upon the vehicle wheel. Furthermore, it is both possible that a wheel torque is effective at both vehicle wheels, the magnitude of the wheel torques being different, and the situation in which a resultant wheel torque is effective at only one vehicle wheel, and the opposite vehicle wheel does not experience any braking torques or drive torques.

In order to avoid an undesired response by the vehicle in an extreme driving situation, in which the vehicle experiences a change in the travel state due to a load, the torque distribution between the vehicle wheels is changed after the detection of such a situation. In this way, an intervention is made in the driving-dynamic state of the vehicle, so that, for example, oversteering or understeering is prevented, or such a driving behavior may at least be reduced.

The intervention in the wheel torque distribution depends on the presence of a load change. In a load change, a change takes place, within a short period, from an acceleration state to an overrun state, or vice versa, namely, by the sudden release or the sudden application of the accelerator, possibly in combination with a braking intervention by a driver assistance system or by the driver. During a load change, if the vehicle is in an extreme driving situation, in which, to be sure, the vehicle is still moving in stable fashion on its setpoint trajectory, but will become unstable even from a slight change, especially an increase in speed, without the function according to the present invention, and in the case of an already present wheel torque difference, load changes may lead to oversteering, or possibly also understeering of the vehicle. However, the driving response may be stabilized via the intervention in the torque distribution between the vehicle wheels, preferably between driven vehicle wheels, so that the load change, that suddenly occurs, does not have a negative effect on the vehicle behavior.

According to one expedient refinement, it is provided that the torque distribution between the vehicle wheels is changed in such a way that the vehicle wheel having the originally lower resultant wheel torque, possibly also having a resultant wheel torque equal to zero, now has a wheel torque value applied to it that exceeds the wheel torque present at the other vehicle wheel. In this instance, there comes into consideration both the situation in which the wheel torque is held constant at one vehicle wheel and the wheel torque at the other vehicle wheel is increased or decreased to reverse the torque ratios, and the situation in which the resultant wheel torques at both vehicle wheels are changed, until the desired new torque ratio has been set. The influencing of the resultant wheel torques is preferably performed by a braking intervention. However, basically a combination of braking intervention and the distribution of drive torques and/or drag torques, or the effect exclusively via drive torques and/or drag torques is possible.

After the new setting of the torque distribution, the absolute value of the resultant wheel torques at each vehicle wheel depends on diverse state variables of the vehicle, and is established particularly in such a way that the setpoint path, on which the vehicle is moving, is able to be maintained. The newly adjusted torque distribution, with respect to the magnitude of the torques, is particularly not necessarily the mirror image of the original torque distribution, even when such an inversion of the torque distribution is basically possible.

The torque distribution expediently takes place at the wheels at the left and the right of a common axle. It is also possible, however, to have a torque distribution over wheels of different axles on different sides or even on the same sides, as well as a torque distribution over three or four vehicle wheels.

In order to determine whether the vehicle is in an extreme driving situation, various criteria may be checked. According to one advantageous embodiment, it is provided that, for the presence of an extreme driving situation, it is checked whether the differential torque, formed from the difference of the resultant, observed wheel torques, exceeds a boundary value. The differential torque is used to change the driving properties of a vehicle with respect to the self-steering properties and/or the traction, and it is a measure for the utilization of the force capacity at the respective axle.

The differential torque may be generated as an additional function of an ESP system (electronic stability program), by which wheel braking torques of different magnitudes are generated for the various vehicle wheels to influence the driving dynamic vehicle behavior. In this instance, a braking intervention is introduced, especially at the inside rear wheel, but, if necessary, also at the outside front wheel, which has the positive effect that the maximum curve speed is increased. According to another expedient embodiment, the differential torque is determined from the actual yaw rate ascertained by a measurement and a calculated setpoint yaw rate, into which goes particularly the current vehicle speed. Since the differential torque, as an additional controller function to an ESP system, is already adjusted to an extreme driving situation, the value of the differential torque, that is, the difference between the wheel torques, may be drawn upon to detect an extreme driving situation. If the differential torque is above an assigned boundary value, one may assume that there is an extreme driving situation present. The differential torque represents an indicator for the utilization of the grip potential between tires and roadway for the vehicle in the borderline range.

The differential torque may be submitted to filtering. Based on the filtering, short peak values, that have only little meaning from a driving dynamics point of view, are not taken into account. Only when there is a large, lasting differential torque does one have to assume a borderline situation. If the value of the differential torque is large over a longer phase, but has already become reduced again at the time of the load change, a stabilization should nevertheless be carried out in the normal case. Using the filtering, the differential torque from previous phases is also taken into account, and the differential torque becomes reduced while having a phase delay, which is used as information.

The boundary value assigned to the differential torque is specified as a fixed quantity, which is only a function of typical vehicle settings, but not of current state variables. But it is also basically possible to determine the boundary value for the differential torque in the vehicle as a function of current state variables.

The state of the load change may be detected via an investigation of the course of the drive torque or a variable correlated with it. Since the distribution of the wheel torques is only supposed to be changed in response to a load change, a certain detection of a current load change in a vehicle is of considerable importance. This takes place by the evaluation of the drive torque or a variable connected to it, for instance, a cardan torque that is effective in a cardan shaft of the vehicle. The torque present at the output end is considered as the drive torque, and it is present at a transmission postconnected to the drive engine. If necessary, taking into account the transmission ratio in the transmission, the engine torque may also be drawn upon for the investigation of a load change.

In order to be able to detect the load change with great certainty, the drive torque or the torque connected to it is submitted to filtering, for instance, low-pass filtering, and subsequently the difference is formed between the unfiltered and filtered torque. In this torque difference, sudden accelerator changes by the driver are expressed, from which one is able to conclude a load change. There is a load change if the difference of filtered and unfiltered torque exceeds an assigned boundary value.

Provided all the conditions are present, that is, if both the extreme driving situation and a load change are present, the torque distribution is changed in the manner described above, in order to keep the vehicle stable.

The example method according to the present invention is carried out in a regulating or control unit, which may be a part of a driver assistance system or may be assigned to such a driver assistance system, for instance, an electronic stability program ESP.

DETAILED DESCRIPTION OF EXAMPLE EMBODIMENTS

Figure 1:
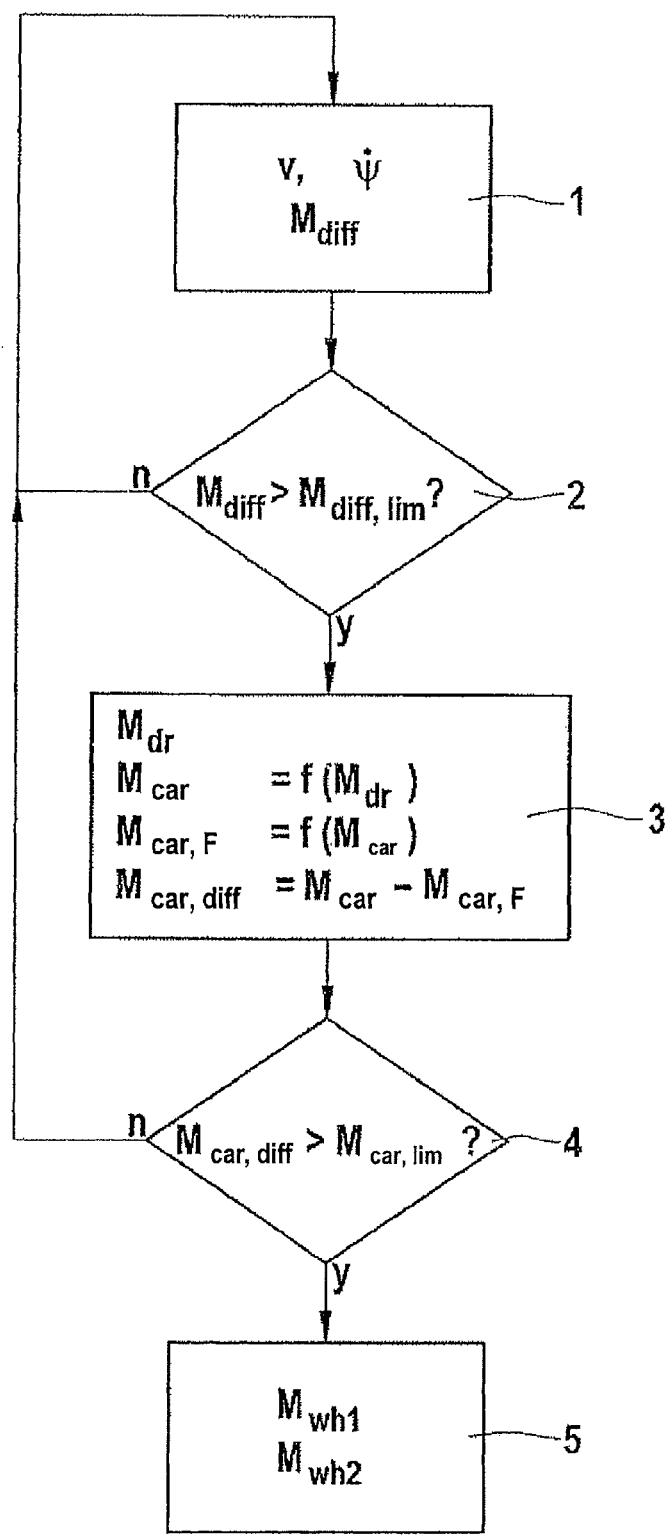
FIG. 1 shows a sequence diagram having method steps for carrying out the example method.
Figure 2:
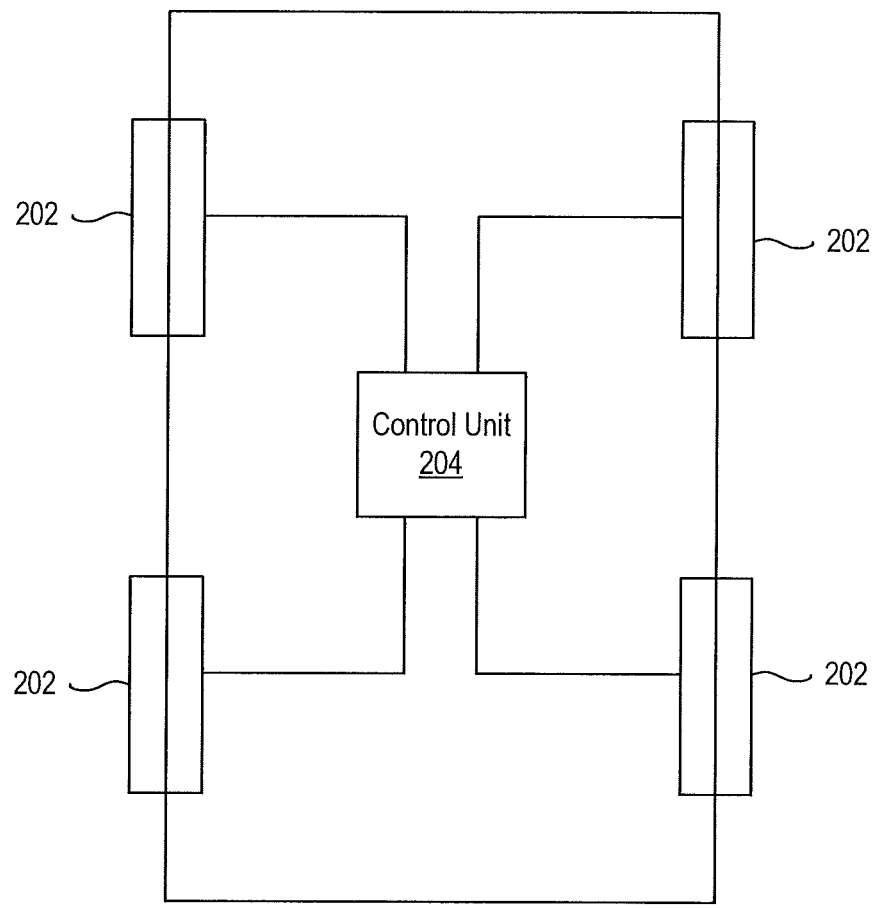
FIG. 2 shows a vehicle having a control unit and a device for carrying out the example method.

FIG. 2 shows a vehicle 200 having a control unit 204 and actuating devices 202. To carry out the example method, on the hardware part an actuating device is assumed, using which the wheel torque may be influenced at at least two vehicle wheels. The actuating device 202 may be a wheel braking device, which makes it possible to generate automatically wheel braking torques of different magnitudes at the different vehicle wheels. Although shown at each of the four wheels, the actuating device 202 may also be placed elsewhere to exert a torque on at least one wheel. A vehicle may also have number of actuating devices 202. In addition, one may also consider an active coupling member (a torque vectoring differential) for distributing drive torques between different drive wheels.

The method sequence shown in the figure assumes that, via an actuating device, there is already present an effective differential torque $M_{diff}$ at two different vehicle wheels, particularly at the wheels of a common axle. In order to carry out a differential torque $M_{diff}$ having appertaining wheel torques $M_{wh1}, M_{wh2}$ for the case of a load change in a boundary-stable driving situation, it is checked first whether these additional assumptions, boundary-stable driving situation and load change, are present.

In a first method step 1, diverse state variables are first recorded or ascertained using measured variables, using the host vehicle's sensor system. This sensor system may be an ESP sensor system, for example. Among other things, vehicle speed v and actual yaw rate $\Psi'$ are recorded.

From vehicle speed v and perhaps additional state variables, especially transverse dynamic variables such as the vehicle's transverse acceleration, a setpoint yaw rate $\Psi'_d$ may be ascertained, a value for a torque difference $M_{diff}$ being able to be ascertained from the actual yaw rate $\Psi'$ and setpoint yaw rate $\Psi'_d$.

This torque difference is present as output variable in a controller of particularly the ESP system, and is ascertained preferably in extreme driving situations, and is specified via an actuating device of the vehicle, preferably via a distribution of wheel braking torques, in order to have a specific effect on the driving dynamics of the vehicle. An understeering tendency may be avoided, for instance, via the torque difference $M_{diff}$, in order to produce a sportier driving response.

Since, at the same time, the ascertained torque difference $M_{diff}$ represents an indicator for the coefficient of friction between tire and roadway, an extreme driving situation may be determined by an evaluation of the torque difference. For this purpose, in method step 2, it is checked whether torque difference $M_{diff}$ is exceeding an assigned boundary value $M_{diff,lim}$. If this is the case, an extreme driving situation is not yet present which would make a change in the current torque distribution necessary. In this case, following the no-branching ("N"), the system returns again to the beginning of the first method step.

Otherwise, the first condition for a change in the torque distribution is satisfied, and following the yes-branching ("Y"), the system proceeds to next method step 3. In method steps 3 and 4 there takes place the checking of the second condition, that is, whether a load change is currently taking place in the vehicle. For this purpose, in method step 3, current drive torque $M_{dr}$ is first ascertained, from which a cardan torque $M_{car}$ acting on a cardan shaft is calculated, which may be implemented as a function of drive torque $M_{dr}$. Cardan torque $M_{car}$ is submitted to filtering, the filtered cardan torque $M_{car,F}$ being able to be implemented as a function of unfiltered cardan torque $M_{car}$. Then, difference $M_{car,diff}$ between unfiltered cardan torque $M_{car}$ and filtered cardan torque $M_{car,diff}$ is formed.

In the following method step 4, a query takes place as to whether the torque difference $M_{car,diff}$ is exceeding an assigned boundary value $M_{car,lim}$. If this is the case, one may assume a load change in the vehicle, whereupon the system following the yes-branching is advanced to next method step 5. Otherwise, following the no-branching, the system returns to the first method step again, and a new sequence of the entire method takes place.

In method step 5, wheel torques $M_{wh1}$ and $M_{wh2}$ are calculated again, and are produced via the assigned actuating devices, especially the wheel braking devices. In this way, differential torque $M_{diff}$ is newly set between the wheels. The setting takes place particularly in such a manner that the vehicle remains stable in spite of the load change that has taken place in the boundary-stable driving situation. In this instance, the existing torque ratio is preferably basically reversed, that is an originally larger wheel torque on one vehicle wheel is changed to a smaller torque with reference to the wheel torque at the opposite vehicle wheel. The absolute magnitude of the wheel torques is determined anew.

Boundary values $M_{diff,lim}$ for differential torque $M_{diff}$ and $M_{car,lim}$ for the torque difference between the filtered and unfiltered cardan torque are able to be specified as fixed values. However, one may also consider an ascertainment as a function of current state variables.

What is claimed is:

1. A method for generating a differential torque acting on vehicle wheels of a vehicle, comprising:
    detecting a load change and an extreme driving situation that are simultaneous with one another;
    responsive to the detection of the load change and the extreme driving situation, changing a torque distribution between vehicle wheels in a case in which wheel torques of different magnitudes are present at the vehicle wheels;
    wherein the load change is at least one of: (a) a change from an acceleration state to an overrun state by a sudden release of an accelerator, and (b) a change from an overrun state to an acceleration state by a sudden application of an accelerator.

2. The method as recited in claim 1, wherein the torque distribution between the vehicle wheels is changed in such a way that a vehicle wheel originally having a lower wheel torque is acted upon by a wheel torque exceeding another vehicle wheel.

3. The method as recited in claim 1, further comprising:
    checking whether a differential torque, formed from a difference of the wheel torques, exceeds a boundary value to determine if the vehicle is in an extreme driving situation.

4. The method as recited in claim 3, wherein the differential torque is determined from at least one of an actual yaw rate, a setpoint yaw rate, and other state variables of the vehicle.

5. The method as recited in claim 1, wherein the load change is detected from one of a change in a course of a drive torque, or a variable correlated to the change in the course of the drive torque.

6. The method as recited in claim 5, wherein the load change is detected from a change in a course of a cardan torque that is active in a cardan shaft in the vehicle.

7. A method for generating a differential torque acting on vehicle wheels of a vehicle, comprising:
    detecting a load change and an extreme driving situation that are simultaneous with one another;
    responsive to the detection of the load change and the extreme driving situation, changing a torque distribution between vehicle wheels in a case in which wheel torques of different magnitudes are present at the vehicle wheels, wherein the load change is detected from one of a change in a course of a drive torque, or a variable correlated to the change in the course of the drive torque, wherein, to detect the load change, the observed torque is filtered, and a difference of the unfiltered and the filtered torque is formed, the load change being present if the difference exceeds a threshold value.

8. The method as recited in claim 1, wherein the differential torque is generated by a braking intervention.

9. The method as recited in claim 1, wherein the differential torque is generated by a distribution of the drive torque.

10. A control device for generating a differential torque acting on vehicle wheels of a vehicle, the control device configured to change a torque distribution between vehicle wheels in a case in which the vehicle is in a load change and simultaneously in an extreme driving situation in which wheel torques of different magnitudes are present at the vehicle wheels wherein the load change is at least one of: (a) a change from an acceleration state to an overrun state by a sudden release of an accelerator, and (b) a change from an overrun state to an acceleration state by a sudden application of an accelerator.

11. A device in a vehicle having an electronic stability program having a control device, the control device for generating a differential torque acting on vehicle wheels of a vehicle, the control device configured to change a torque distribution between vehicle wheels wherein the load change is at least one of: (a) a change from an acceleration state to an overrun state by a sudden release of an accelerator, and (b) a change from an overrun state to an acceleration state by a sudden application of an accelerator in a case in which the vehicle is in a load change and simultaneously in an extreme driving situation in which wheel torques of different magnitudes are present at the vehicle wheels.

12. The device as recited in claim 11, further comprising:
    an actuating device for generating a differential torque between the vehicle wheels.

* * * * *